Oct. 6, 1953
J. H. BACON
2,654,179
BIRD WHISTLE
Filed June 23, 1951
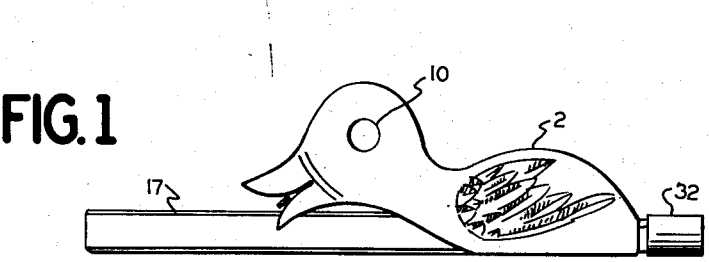
FIG. 1
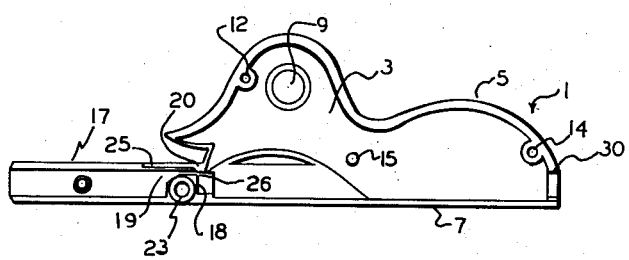
FIG. 2
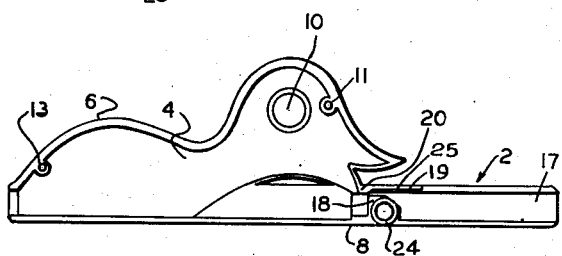
FIG. 3
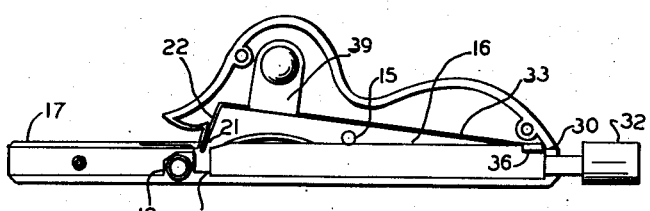
FIG. 4
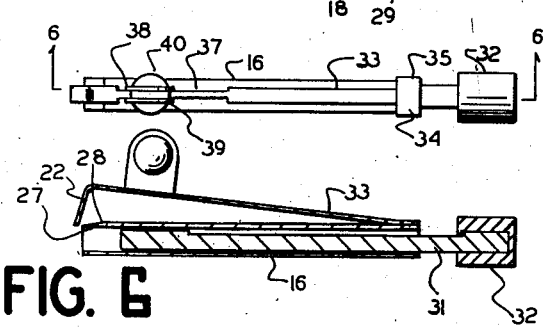
FIG. 5
FIG. 6
INVENTOR.
John H. Bacon
BY Ezekiel Wolf
his Attorney Patented Oct. 6, 1953

2,654,179

UNITED STATES PATENT OFFICE 2,654,179

BIRD WHISTLE

John H. Bacon, Wellesley, Mass.

Application June 23, 1951, Serial No. 233,221

8 Claims. (Cl. 46—44)

The present invention relates to a bird call whistle and is a continuation in part, to the extent to which the same subject matter has been disclosed and claimed, of my prior co-pending application, Serial No. 45,317, filed August 20, 1948.

In the above prior application, Figures 7, 8, 9, 10 and 11 relate to a form of invention in which the whistle in addition to other features provides an animation of the eyes of the bird in connection with the operation of the whistle. In the arrangement shown in Figures 12, 13, 14 and 15, there is also provided an animation of the beak or tongue of a bird.

The present invention relates to these modified forms and more particularly to constructional features in which the toy whistle or bird call device is made of two main parts and joined together along a longitudinal central plane. In the present invention, in order to provide the desired results, namely, of being able to imitate certain bird calls, it is necessary that the toy be accurately made and put together, and for this purpose the parts must fit with close tolerances, particularly the position of the mouth, the edge of the resonance tube and the direction of the air blast. In the present device, the outer shell which includes the mouthpiece is moulded of plastic material. This outer shell positions accurately an inner resonant tube at the end of the mouthpiece with the sharp edge of the tube in line with passage at the end of the mouthpiece to provide the necessary full tone and quality which is desired for the whistle. The inner tube with its adjustable piston may be made of metal, preferably brass, although a hard resonant plastic may be used. The piston is adjustable so that the pitch of the whistle note may be varied.

Without further describing the merits and advantages of the present invention, the invention will be more fully described in the specification set forth below when taken in connection with the drawings illustrating an embodiment thereof in which:

Figure 1 shows a side elevation of my bird call whistle;

Figure 2 shows a half longitudinal portion of the shell corresponding to the half of the shell in back of the portion shown in Figure 1;

Figure 3 shows the other half of the shell corresponding to the outside portion shown in Figure 1 but viewed from the inside;

Figure 4 shows the same element in Figure 2, with the addition of the pipe and piston assembly;

Figure 5 shows a plan view of the pipe and piston assembly shown in Figure 4; and, Figure 6 shows a section line taken on the line 6—6 of Figure 5.

In the arrangement shown in the figures, the enclosing half shells 1 and 2 of Figures 2 and 3 respectively, are moulded plastic elements of comparatively thin plastic material which may be thermoplastic or thermosetting in character, such for instance as cellulose acetate, polystyrene, nitro-cellulose, acrylic, vinyl, or urea resins or some other thermosetting materials. The half shells 1 and 2, have half form of a bird figure such as 3 and 4 which are moulded as an integral part of the rest of the half shell. The parts 1 and 2 are complementary in nature and are constructed with fitting or interlocking edges 5 and 6 respectively around the bird and along the longitudinal base edges 7 and 8 of the shell which base encloses the resonant tube which will be mentioned later. The interlocking or fitting of these edges may be accomplished by a tongue and groove or by a shoulder and flange or in any other manner which may be suitable to the moulding process which is used. As far as the form of construction is concerned, the bird is provided with opposite eye openings 9 and 10 and with certain engaging bosses and recesses so that the two halves will have additional holding means besides the cement used to bind the halves together. These bosses and cooperating recesses may be located part on one side and part on the other side of the moulded sections on the inside. The boss 11 Figure 3 will fit in the recess 12 Figure 2 and similarly the boss 13 and the recess 14. The projecting pin 15 aids in maintaining the resonant tube 16 in its proper position. Consideration of Figures 2, 3 and 4 show that at one end of each half of the shell there is a mouthpiece section 17 at the inner end of which is a block 18 which provides an inclined narrowing passage 19, the end of which is adjacent opening 20 into which the end 21 of the deflecting plate 22 slightly extends as indicated in Figure 4. This will be discussed more fully later.

The block 18 is moulded as a part of each half section and fits together in the boss 23 and its corresponding recess 24 Figure 3. Each half of the opening 20 is moulded into each section 1 and 2 so as to form a complete mouth-opening extending across the top of the mouthpiece 17. It will be noted adjacent to the opening 20 the top wall of the mouthpiece 17 is considerably thinned as indicated at 25, and that a very narrow passage is provided in this thinned section 25 between the top wall of the shell and the surface of the block section 18. This passage designated as 26 is directed to the edge of the tube 16 which edge is tapered as shown at 27 Figure 6. This permits the blast of air coming through the passage to be directed at the upper edge of the tube and in this way provides a resonance in the wall of the tube in a longitudinal direction and splits the air blast through the passage 26 some passing over the top tapered edge of the tube and some down in the tube. The tapering at this edge 27 is on the top surface 28 so that the upper portion of the split blast is given, outside of the tube, a slightly upwardly inclined direction out of the mouth-opening.

The tube 16 is held firmly in position in the shell by the side walls of the shell, the shoulder or corner 29 at the lower forward end just behind the block 18 Figure 4, and at the rear of the shell, by the flange 30. It is also held in place by the top pin 15. When the two sections of the device are put together and cemented in place, not only is the mouthpiece made airtight around its sides, but also the metallic tube 16 is positioned squarely behind the block 18 so that the edge 27 is properly aligned with the direction of the blast coming through the passage 26. The tube 16 may be square or round, but where the passage 26 is flat the edge 27 should also be flat. In Figures 5 and 6, it is shown as square with a piston 31 moveable longitudinally within the tube. This piston may at its end be provided with a cap 32 which is secured to the end of the piston in any suitable manner.

Figures 4, 5 and 6 show the arrangement for mounting the vibratable leaf spring 33. This spring at its end is provided with two side extending sections or tabs 34 and 35 which are clamped or held over the side sections of the tube as indicated at 36, Figure 4. When the two outer shells are put together these edges will be tightly held in place. If desired other additional means may be used to secure the ends of the vibratable spring 33. The free end of the vibratable spring 33 terminates in the inwardly bent section 22 which is part of the spring but has been designated as a deflecting plate which dips slightly into the mouth-opening 20 of the mouthpiece only sufficiently to be caught by the upwardly directed portion of the air blast. In the decreased section 37 of the spring 33 are two upwardly bent flanges 38 and 39 which may be a part of the same material as the spring. These upwardly extending flanges or arms have holes in which a translucent ball 40 is held which serves as the eyepiece for the bird and registers with the eye openings 9 and 10 in the shell.

The manner of using the invention just described is quite obvious from the description. The vibratable spring 32 will vibrate at a substantially fixed frequency due to the fact that the portion of the air blast deflected upwardly by the edge 27 creates a disturbance which causes end 22 of the spring to dip downward and momentarily interrupt the blast against the edge of the pipe. The piston as it is moved in or out will govern the pitch of the whistle. The interruptions caused by the vibration of the spring 33 will produce a warble, since as the tongue or deflecting plate dips into the mouth of the whistle the air passing through the passage and against the edge of the pipe will be modulated to produce a true warble effect. The combination of the warble and the change in pitch is sufficient to imitate a great number of bird calls.

As a toy the whistle has the additional attraction that the figure of the bird has animated eyes as the warble is produced.

Having described my invention, I now claim:

1. In combination with an air jet operated sound instrument of the organ pipe type a deflecting plate having an edge dipping into the mouth of the pipe, a spring supporting said deflecting plate, means connecting said spring with said pipe, a bird figure mounted on said pipe, and means connected with said spring forming a part of said figure whereby when the spring is vibrated an animation is supplied to said figure.

2. In combination with an air jet operated sound instrument of the organ pipe type a deflecting plate having an edge dipping into the mouth of the pipe, a spring supporting said deflecting plate, means connecting said spring to said pipe in a longitudinal direction therewith, a bird figure mounted on said pipe, and means connected with said spring forming a part of the beak and the eyes of said figure whereby when the spring is vibrated an animation is supplied to said figure.

3. A bird call whistle of the type described comprising a plastic housing formed of two longitudinal sections secured together forming a mouthpiece at one end having a thin air conduit terminating in a mouth opening, a resonant tube secured in said housing with an open end having on one side a knife edge in line with said air conduit whereby a blast of air through said mouthpiece will pass through said conduit and impinge upon said knife edge, a leaf spring connected to said tube longitudinal therewith with one end secured away from said knife edge, said leaf spring having an end bent to dip slightly into the mouth opening in front of said knife edge.

4. A bird call whistle of the type described comprising a plastic housing having a mouth piece at one end with an air passage therein confining the air in a narrow stream and a mouth opening adjacent the end of the passage, a resonant tube having an open end with a sharp edge in alignment with said air passage at said mouth opening, means securing said resonant tube within said plastic housing and a leaf spring with one end clamped to the tube and the other end having an extension dipping slightly into said mouth piece.

5. A bird call whistle of the type described comprising a plastic housing having a mouthpiece at one end with an air passage therein confining the air in a narrow stream and a mouth opening adjacent the end of the passage, a resonant tube having an open end with a sharp edge in alignment with said air passage at said mouth opening, means securing said resonant tube within said plastic housing, a leaf spring having one end resting on said tube with side extensions going over the sides of the tube and held against the tube by said housing, said other end of the leaf spring having an inclined deflecting plate extending down to the said mouth opening.

6. A bird call whistle of the type described comprising a plastic housing having a figure of a bird with eye openings and a mouthpiece at one end with an air passage therein confining the air in a narrow stream and a mouth opening adjacent the end of the passage, a resonant tube having an open end with a sharp edge in alignment with said air passage at said mouth opening, means securing said resonant tube within said plastic housing, a leaf spring having one end resting on said tube with side extensions going over the sides of the tube and held against the tube by said housing, said other end of the leaf spring having an inclined deflecting plate extending down to the said mouth opening, said spring having side tabs extending upwards in a parallel direction and a translucent member serving as a pair of eyes secured therein opposite said eye openings.

7. A bird call whistle of the type described comprising a plastic housing formed of two longitudinal sections secured together forming a mouthpiece at one end having a thin air conduit terminating in a mouth opening, a resonant tube, said housing having a longitudinal cavity therein to receive and secure said resonant tube, said resonant tube having an open end with a sharp tapered edge opposite said thin air conduit at the mouth opening a leaf spring mounted over said tube longitudinal therewith with one end secured away from said knife edge, said leaf spring having an end bent to dip slightly into the mouth opening in front of said knife edge.

8. A bird call whistle of the type described comprising a plastic housing formed of two longitudinal sections secured together forming a mouthpiece at one end having a thin air conduit terminating in a mouth opening, a resonant tube, said housing having a longitudinal cavity therein to receive and secure said resonant tube, said resonant tube having an open end with a sharp tapered edge opposite said thin air conduit at the mouth opening a leaf spring mounted over said tube longitudinal therewith with one end secured away from said knife edge, said leaf spring having an end bent to dip slightly into the mouth opening in front of said knife edge, said housing having the features of a bird with eye openings and an eyepiece supported by said leaf spring vibrating with said leaf spring to supply an animation to the eyes of the bird.

JOHN H. BACON.

References Cited in the file of this patent

UNITED STATES PATENTS

| Number | Name | Date |
|---|---|---|
| 235,641 | Morris | Dec. 21, 1880 |
| 603,555 | Davis | May 3, 1898 |
| 1,703,382 | Bernard | Feb. 26, 1929 |
| 1,855,527 | Muehlstein | Apr. 26, 1932 |